United States Patent Office 3,511,842
Patented May 12, 1970

3,511,842
4-AMINO TETRAHYDROQUINOLINES
Alfred Sallmann, Bottmingen, Switzerland, assignor to Geigy Chemical Corporation, Greenburgh, N.Y., a corporation of Delaware
No Drawing. Filed Dec. 27, 1966, Ser. No. 604,624
Claims priority, application Switzerland, Dec. 30, 1965, 100/66
Int. Cl. C07d 33/10
U.S. Cl. 260—288          11 Claims

ABSTRACT OF THE DISCLOSURE (a) Tetrahydroquinolines of the formula

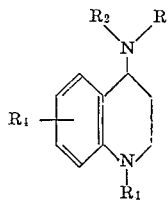

wherein:

$R_1$ represents lower alkyl or lower alkenyl,
$R_2$ represents lower alkyl, lower alkenyl or a lower saturated cycloaliphatic hydrocarbon radical,
$R_3$ represents hydrogen or lower alkyl, and
$R_4$ represents hydrogen, halogen of an atomic number not greater than 35, lower alkyl, lower alkoxy, trifluoromethyl or nitro, and their pharmaceutically acceptable salts with inorganic and organic acids, which compounds are anti-depressive and drive-enhancing without unfavourable effects on hypertension; and are further antitussive and anorexic; (b) Intermediates for their production, especially compounds of the above formula in which at least one of $R_1$ and $R_2$ is replaced by hydrogen, which are themselves anti-depressives; compositions containing the above defined compounds as active agents; and methods of treating depressed states of the mind and deficiency of drive by the aforesaid compounds and compositions.

---

The present invention concerns new tetrahydroquinoline derivatives, processes for producing the same and pharmaceutical preparations containing these novel compounds, as well as the administration of the latter.

More in particular, in a first aspect, the invention provides for tetrahydroquinoline derivatives of the general Formula I

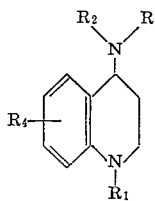

wherein:

$R_1$ represents a lower alkyl or lower alkenyl group,
$R_2$ represents a lower alkyl or lower alkenyl group or a lower saturated cycloaliphatic hydrocarbon radical,
$R_3$ represents hydrogen or a lower alkyl group, and
$R_4$ represents hydrogen, a halogen atom of an atomic number up to 35, inclusive, a lower alkyl or lower alkoxy group, the trifluoromethyl group or nitro group, and their addition salts with inorganic and organic acids, which compounds have valuable therapeutical properties.

They antagonise, for instance, the depressant action of neuroleptica without increasing the blood pressure or the effect of catecholamines. The new compounds according to the invention are useful as a new type of psychostimulants which are chemically distinctly different from the known pharmaceutical preparations. They are useful in the treatment of depressed states of the mind and also of deficiency of drive of various origin including such deficiencies caused by depression, without having an unfavourable effect on states of hypertension which may accompany them. Compounds of general Formula I also have anti-trussive and anorexic effects.

The new tetrahydroquinoline derivatives of the general Formula I can be administered orally, rectally, or in the form of aqueous solutions of their salts, also parenterally. If desired, they can also be combined with other pharmaceuticals.

In the tetrahydroquinoline derivatives of the general Formula I and the corresponding starting materials which are defined below, $R_1$ as lower alkyl is, e.g. the methyl, ethyl, n-propyl, isopropyl, n-butyl, isobutyl, n-pentyl or isopentyl group and, as a lower alkenyl group, e.g. the allyl, 2-butenyl, 3-butenyl, 1-methyl-prop-2-enyl, 2-methyl-prop-2-enyl, 2-, 3-, 4-pentenyl or 3-methyl-pent-2-enyl group.

$R_2$ is, for example, one of the lower alkyl or lower alkenyl groups mentioned above or, as lower saturated cycloaliphatic hydrocarbon radical, it is, e.g. a lower cycloalkyl group such as the cyclopropyl, cyclobutyl, cyclopentyl or cyclohexyl group, or a lower cycloalkylmethyl group such as the cyclopropylmethyl or cyclohexylmethyl group. As lower alkyl group, $R_3$ is one of the alkyl groups mentioned above as examples of $R_1$. Any substituent $R_4$ is preferably in the 6- or 7-position; as lower alkyl or lower alkoxy group, $R_4$ is, e.g. the methyl, ethyl, n-propyl, isopropyl, n-butyl or tert. butyl group or the methoxy, ethoxy, n-propoxy, isopropoxy or n-butoxy group. As halogen atom, $R_4$ is chlorine, bromine or fluorine. Compounds of general Formula I in which $R_3$ is hydrogen are preferred on account of particularly pronounced anti-depressive action.

To produce the new tetrahydroquinoline derivatives of Formulas I and Ia and their acid addition salts, a novel intermediate compound of one of the general Formulas II

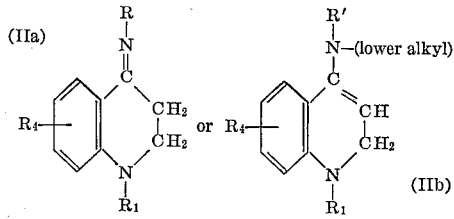

wherein:

R represents a lower alkyl or lower alkenyl group or a lower saturated cycloaliphatic hydrocarbon radical or the hydroxyl group,
R' represents a lower alkyl group or a lower saturated cycloaliphatic hydrocarbon radical, and
$R_1$ and $R_4$ have the same meanings as in Formula I, is reduced and, if desired, the compound of general Formula I thus obtained is then converted into an addition salt with an inorganic or organic acid.

The reduction of compounds of general Formulas IIa and IIb can be performed by means of catalytically activated hydrogen. In this reduction there can be used, for example, palladium on charcoal or another conventional carrier, or Raney nickel as catalyst, and an inert organic solvent which is at least partly miscible with water, e.g. dioxan, to which a small amount of sodium hydroxide solution has been added. As reaction conditions, generally room temperature and normal pressure are sufficient; if necessary the hydrogenation is accelerated by increasing the pressure and/or temperature. Also chemical methods such as the reaction with a complex hydride, e.g. lithium aluminum hydride or diborane in an ether or ether-type organic liquid, or the reaction with sodium or potassium borohydride, e.g. in a lower alkanol such as methanol, are suitable in particular for the reduction of compounds of general Formula IIa having a semicyclic double bond. Such reactions are performed at room temperature up to moderately high temperatures, e.g. the boiling temperature of the solvent used.

Starting materials of the general Formula IIa are imines of 2,3-dihydroquinoline-4(1H)-one or, depending on the meaning of $R_1$ and $R_4$, imines of substituted derivatives thereof. Some ketones of this type are known and others can be produced analogously to those known; their imines can also be produced by methods known per se.

For example, 2,3-dihydroquinoline-4(1H)-ones used as starting materials for the preparation of compounds IIa can be prepared, according to the procedure set forth by R. Elderfield et al., in Am. Soc. 71, 1906 (1949). The imines IIa can be prepared according to the methods disclosed in U.S. Pat. 2,653,940.

The starting materials of the general Formula IIb are enamines and can be obtained, e.g. by reduction of known 4-dialkylamino-carbostyrils, which can be substituted corresponding to the definition of $R_1$ and $R_4$, and of other 4-tertiary aminocarbostyrils which can be produced in an analogous way, by means of lithium aluminium hydride in an ether or ether-type solvent such as tetrahydrofuran.

The 4-dialkylamino-carbostyrils used as starting materials for the production of compounds of Formula IIb can be prepared according to the procedure described in U.S. Pat. 3,301,861.

Additionally, Pfister U.S. Pat. 3,178,434 describes the synthesis of the 4-amino-carbostyrils which, upon reduction, yield the starting compounds of Formula Ia.

Tetrahydroquinoline derivatives of the general Formula I wherein the radical $R_3$ represents a lower alkyl group and $R_1$, $R_2$ and $R_4$ have the meanings given in Formula I, and their acid addition salts are produced by a second process in which a compound of the general Formula I wherein $R_1$, $R_2$ and $R_4$ correspond to the definitions given and $R_3$ is hydrogen, or a novel intermediate compound of the formula

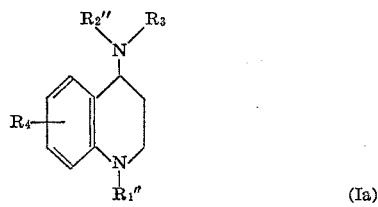

(Ia)

wherein $R_3$ and $R_4$ have the same meanings as in Formula I and $R_1''$ and $R_2''$ have the same meanings as $R_1$ and $R_2$ but at least one or both of $R_1$ and $R_2$ are hydrogen, is reacted in the presence of an acid binding agent with a reactive ester of a lower alkanol in an amount at least corresponds to the number of hydrogen atoms to be replaced, or, if desired, when $R_1$ and/or $R_2$, but not $R_3$ is hydrogen, it is reacted with a reactive ester of a lower alkenol in an amount which at least corresponds to the number of hydrogen atoms to be replaced, or, if desired, when $R_2$ but not $R_1$ and $R_3$, is hydrogen, it is reacted with at least the equimolar amount of a reactive ester of a lower saturated cycloaliphatic hydroxy compound and, if desired, the compound obtained of general Formula I is converted into an addition salt with an inorganic or organic acid.

The intermediates of Formula Ia are themselves useful as antidepressive agents in the treatment of depressed states of the mind.

Examples of reactive esters of lower alkanols, lower alkenols and of lower, saturated cycloaliphatic hydroxy compounds which can be used are halides such as chlorides, bromides or iodides, lower alkane sulphonic acid esters such as methane sulphonic acid ester, and aryl sulphonic acid esters such as p-toluene sulphonic acid ester, as well as dimethyl sulphate and diethyl sulphate. Suitable solvents are, e.g. lower alkanols such as ethanol, methanol, isopropanol, n-butanol, lower alkanones such as acetone and butanone, also, e.g. dimethyl formamide, dioxan, tetrahydrofuran and benzene, and suitable acid binding agents are, in particular, alkali metal carbonates also tertiary organic bases such as N-methyl-di-isopropylamine, collidine, quinoline or quinaldine. The reactions are preferably performed at room temperature or moderately raised temperatures.

A third process for the production of tetrahydroquinoline derivatives of the general Formula I wherein $R_1$, $R_2$, $R_3$ and $R_4$ have the meanings given in Formula I but at least one of the radicals $R_1$, $R_2$ and $R_3$ represents a primary alkyl radical, or $R_1$ and/or $R_2$ represent a primary alkenyl radical, or $R_2$ represents a primary cycloaliphatic hydrocarbon radical, consists in reducing, by means of a complex hydride, a compound of the general Formula III

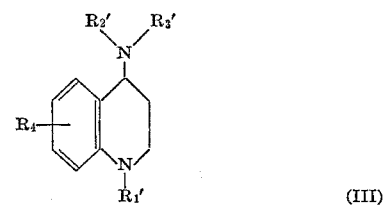

(III)

wherein:

$R_1'$, $R_2'$ and $R_3'$ represent radicals corresponding to the definitions of $R_1$, $R_2$ or $R_3$, respectively, with the exception that one of the radicals $R_1'$, $R_2'$ and $R_3'$ represents a lower alkanoyl group or lower alkoxycarbonyl and/or wherein $R_1'$ and/or $R_2'$ represent a lower alkenoyl group, and/or wherein $R_2'$ represents a primary cycloaliphatic hydrocarbon-carbonyl, especially a cycloalkyl-carbonyl radical, and $R_4$ has the meaning given in Formula I, and, if desired, converting the compound obtained of general Formula I into an addition salt with an inorganic or organic acid.

As complex hydride, preferably lithium aluminium hydride or diborane is used in an ether-type organic solvent such as diethyl ether, dibutyl ether, tetrahydrofuran, dioxan, ethylene glycol dimethyl ether or diethylene glycol dimethyl ether. The reaction temperature is preferably between room temperature and about 100°. The diborane is developed, for example, from boron trifluoride etherate and sodium borohydride, either in a separate apparatus and introduced into the reaction mixture, or it is formed in situ.

The starting materials of general Formula III, in their turn, are new substances. They are produced, for example, by acylating compounds of general Formula I wherein at least one of the radicals $R_1$, $R_2$ and $R_3$ is a hydrogen atom, with reactive functional derivatives of lower alkanoic or alkenoic acids, or cycloalkane carboxylic acids such as formic acid ethyl ester, acetanhydride, acetyl-, propionyl-, butyryl-, isobutyryl-, acrylyl-, methacrylyl- or crotonyl- chloride or cyclopropane carbonyl chloride. Thus, with the incluison of the acylation necessary for the production of compounds of general Formula III, the present process is actually a subsequent conversion of compounds of general Formula I which have been produced by another process.

The tetrahydroquinoline derivatives of general Formula I obtained by one of the processes according to the invention are then converted in the usual way, if desired, into addition salts with inorganic and organic acids. For example, the acid of the salt desired as anion component, or a solution thereof, is added to a solution of a tetrahydroquinoline derivative of general Formula I in an organic solvent. Preferably solvents in which the corresponding salt is difficulty soluble are chosen for the reactions so that the salt can be isolated by filtration. Such solvents are, for example methanol, methanol/ether and ethanol/ether.

For use as active ingredients in pharmaceuticals, instead, of the free bases, suitable acid addition salts can be used, i.e. salts with those acids the anions of which are pharmaceutically acceptable in the usual dosages. In addition, it is of advantage if the salts to be used as active ingredients can be crystallised well and are not or are only slightly hygroscopic. For example, hydrochloric acid, hydrobromic acid, sulphuric acid, phosphoric acid, methane sulphonic acid, ethane sulphonic acid, $\beta$-hydroxyethane sulphonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid can be used for salt formation with tetrahydroquinoline derivatives of general Formula I.

If desired, the compounds of general Formula I, which are obtained as recemates, can be resolved in the usual way by salt formation with optically active acids and fractional crystallistaion into their optically active forms.

Another aspect of the invention concerns methods of treating depressed states of the mind and of treating deficiency of drive in higher mammals, especially primates, which comprises administering to a patient suffering therefrom an antidepressive and/or drive-enhancing dose of a compound according to the invention or a pharmaceutical composition containing such compound as active ingredient.

The new active substances are administered orally, rectally and parenterally. The daily dosages of the free bases or of pharmaceutically acceptable salts thereof vary between 10 and 400 mg. for adult patients. Suitable dosage units such as dragées, tablets, suppositories or ampoules preferably contain 5–50 mg. of a tetrahydroquinoline derivative according to the invention or of a pharmaceutically acceptable salt thereof. Also, corresponding amounts of compositions not made up into single dosages such as syrups can be used.

Dosage units for oral adminstration preferably contain between 1–90% by weight of a tetrahydroquinoline derivative of general Formula I or of a pharmaceutically acceptable salt thereof as active substance together with, e.g. solid, pulverulent carriers such as lactose, saccharose, sorbitol, mannitol; starches such as potato starch, corn starch or amylopectin, also laminaria powder or citrus pulp powders; cellulose derivatives or gelatine, optionally with the addition of lubricants such as magnesium or calcium stearate or polyethylene glycol (Carbowax) of suitable molecular weight to form tablets or dragée cores. The latter are coated, e.g. with concentrated sugar solution, which can also contain, e.g. gum arabic, talcum and/or titanium dioxide, or with a lacquer dissolved in easily volative organic solvents or mixtures of solvents. Dyestuffs can be added to these coatings, e.g. to distinguish between varying dosages of active substance.

Examples of dosage units for rectal adminstration are suppositories which consist of a combination of a tetrahydroquinoline derivative of general Formula I or a suitable salt thereof with a neutral fatty foundation, or also gelatine rectal capsules which contain a combination of the base of suitable salt thereof with polyethylene glycol (Carbowax).

Amopules for parenteral, particularly intramuscular, administration preferably contain a water soluble salt of a tetrahydroquinoline derivative of general Forumla I in a concentration of, preferably, 0.5–5% by weight, in aqueous solution, optionally together with suitable stabilising agents and buffer substances.

The following prescriptions further illustrate the production of tablets and dragées:

(a) 250 g. of active substance, e.g. 1-methyl-1,2,3,4-tetrahydro - 4 - methylamino-7-chloroquinoline hydrochloride or 1 - methyl - 1,2,3,4 - tetrahydro-4-[(cyclopropylmethyl)-amino]-quinoline maleate, are mixed with 175.80 g. of lactose and 169.70 g. of potato starch. The mixture is moistened with an ethanolic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets each weighing 100 mg. and containing 25 mg. of active substance. If desired, the tablets can be grooved for better adaptation of the dosage.

(b) A granulate is produced from 250 g. of active substance, e.g. 1-methyl-1,2,3,4-tetrahydro-4-methylamino-7-chloroquinoline hydrochloride, 175.90 g. of lactose and the ethanolic solution of 10 g. of stearic acid. After drying, the granulate is mixed with 56.60 g. of colloidal silicon dioxide, 165 g. of talcum, 20 g. of potato starch and 2.50 g. of magnesium stearate and the mixture is pressed into 10,00 dragée cores. These are then coated with a concentrated syrup of 502.28 g. of crystalline sucrose, 6 g. of shellac, 10 g. of gum arabic, 0.22 g. of dyestuff and 1.5 g. of titanium dioxide and dried. The dragées obtained each weigh 120 mg. and contain 25 mg. of active substance.

The following non-limitative examples illustrate the invention further. The temperatures are given therein as well as in the preceding specification in degrees centigrade; all percentages given in the examples are by weight unless expressly stated otherwise.

EXAMPLE 1

1-methyl-1,2,3,4-tetrahydro-4-methylamino-7-chloroquinoline

A solution of 8.5 g. of 1-methyl-2,3-dihydro-7-chloro-4(1H)-quinoline (see below) and 21.3 g. of anhydrous methylamine in 85 ml. of anhydrous methanol is kept in a steel autoclave for 7 hours at 100° under 100 atm. of nitrogen. The reaction mixture is cooled and concentrated to about 50 ml. under 11 torr 2.6 g. of sodium borohydride are then added in portions to the concentrate which contains the crude 1-methyl-1,2,3,4-tetrahydro-4-methylimino-7-chloroquinoline, the addition being made at 15° while stirring. The whole is stirred for 1½ hours at room temperature and then refluxed for a short time. The mixture is evaporated at 40° under 11 torr and the residue is dissolved in 100 ml. of ether. The ether solution is washed with water, dried over sodium sulphate and evaporated under 11 torr. The residue is distilled under high vacuum. The 1-methyl-1,2,3,4-tetrahydro-4-methylamino-7-chloroquinoline boils at 105–110°/0.001 torr.

To produce the hydrochloride, 2.1 g. of the base are dissolved in 20 ml. of methanol and 10 ml. of 1 N hydrochloric acid. The solution is evaporated at 50° under 11 torr. The residue is crystallised from ethanol/ether. The hydrochloride melts at 197–199°.

The following compounds are obtained analogously:

(a) 1-methyl-1,2,3,4-tetrahydro-4-methylamino-quinoline, B.P. 79–82°/0.03 torr, hydrochloride M.P. 162–163°.

(b) 1-methyl-1,2,3,4-tetrahydro-4-ethylamino-quinoline, hydrochloride M.P. 171–173°;

(c) 1-methyl - 1,2,3,4-tetrahydro-4-cyclopropylamino-quinoline, B.P. 115–120°/0.05 torr., maleate M.P. 121–123°;

(d) 1-n-propyl-1,2,3,4-tetrahydro-4-methylamino-quinoline hydrochloride;

(e) 1-methyl - 1,2,3,4 - tetrahydro-4-cyclohexylamino-quinoline;

(f) 1-methyl-1,2,3,4-tetrahydro - 4 - methylamino-7-trifluoromethyl-quinoline;

(g) 1-methyl-1,2,3,4-tetrahydro-4-methylamino-7-nitro-quinoline.

The 1-methyl-2,3-dihydro - 7 - chloro-4(1H)-quinoline necessary as starting material can be produced, e.g. by the following series of reactions:

(A) 1 - methyl-1,2-dihydro-4-dimethylamino-7-chloroquinoline: A solution of 32.7 g. of 1-methyl-4-dimethylamino-7-chloro-carbostyril in 320 ml. of anhydrous tetrahydrofuran is added dropwise within 30 minutes to a suspension of 15.5 g. of lithium alminum hydride in 320 ml. of anhydrous tetrahydrofuran, the addition being made at 10°. The reaction mixture is then refluxed for 5 hours after which it is left to stand for about 14 hours at room temperature. The mixture is then cooled to 10° and first 16 ml., of water, then 16 ml., of 15% sodium hydroxide solution and finally 48 ml. of water are added while stirring well. The mixture is stirred for 30 minutes at room temperature. It is then filtered and the filter residue is washed with tetrahydrofuran. The filtrate is concentrated at 40° under 11 torr. The 1-methyl-1,2-dihydro-4-dimethylamino-7-chloroquinoline remains as an orange oil.

1-methyl-1,2-dihydro-4-dimethylamino-quinoline, B.P. 82–83°/0.001 torr, M.P. 30–32° (crystallised from petroleum ether) and 1-n-propyl-1,2-dihydro-4-dimethylamino-quinoline are produced in an analogous way.

(B) 1 - methyl-2,3-dihydro-7-chloro-4(1H)-quinolone: A solution of 27.5 g. of 1-methyl-1,2-dihydro-4-dimethylamino-7-chloroquinoline (orange oil) in 300 ml. of ether is added to a mixture of 150 ml. of 2 N sulphuric acid and 150 g. of ice, the addition being made while stirring. The whole is well mixed and another 150 g. of ice are added. The pH of the solution is then made alkaline with concentrated sodium hydroxide solution (pH 9). The mixture is shaken in a separating funnel. The ether phase is separated and the aqueous solution is again extracted with 300 ml. of ether. The combined ether solutions are washed twice with water, dried over sodium sulphate and evaporated at 40° under 11 torr. The residue crystallises from ether/petroleum ether. The 1-methyl-2,3-dihydro-7-chloro-4(1H)-quinolone melts at 85–87°.

1-methyl-2,3-dihydro-4(1H)-quinolone, B.P. 95–99°/0.001 torr, and 1-n-propyl-2,3-dihydro-4(1H)-quinolone are obtained in an analogous manner.

EXAMPLE 2

1-methyl-1,2,3,4-tetrahydro-4-dimethylamino-quinoline

A solution of 5 g. of 1-methyl-1,2-dihydro-4-dimethylamino-quinoline (see Example 1a) in a mixture of 100 ml. of dioxane and 1 ml. of 2 N sodium hydroxide solution is hydrogenated, after the addition of 3 g. of palladium charcoal, at normal pressure and room temperature. The hydrogenation is complete after 14 hours. The catalyst is filtered off and the filtrate is evaporated to dryness. The residue is chromatographed through neutral aluminum oxide. The fractions 2-8 eluted with petroleum ether/ether (9:1) are combined and distilled in a bulb tube. The 1-methyl-1,2,3,4-tetrahydro-4-dimethylaminoquinoline boils at 85–90°/0.03 torr.

EXAMPLE 3

1-methyl-1,2,3,4-tetrahydro-4-dimethylamino-quinoline

A solution of 1.67 g. of 1-methyl-1,2,3,4-tetrahydro-4-methylamino-quinoline (cf. Example 1), 2.0 g. of methyl iodide and 1.1 g. of sodium carbonate in 45 ml. of 95% ethanol is stirred for 4 hours at room temperature. The reaction mixture is filtered and the filtrate is evaporated at 40° under 11 torr. The residue is dissolved in chloroform/ether (1:3). The chloroform/ether solution is washed with water, dried over sodium sulphate and evaporated under 11 torr. The residue, an oil, is chromatographed through 50 g. of Silicagel. The fractions eluted with benzene/ether (9:1) are combined and distilled under high vacuum. The 1-methyl-1,2,3,4-tetrahydro-4-dimethylamino-quinoline boils at 85°/0.01 torr.

EXAMPLE 4

1-methyl-1,2,3,4-tetrahydro-4-dimethylamino-quinoline

A solution of 2.04 g. of 1-methyl-1,2,3,4-tetrahydro-4-(N-methylformamido)-quinoline in 20 ml. of anhydrous tetrahydrofuran is added dropwise to a 5° cold suspension of 1 g. of lithium aluminium hydride in 20 ml. of anhydrous tetrahydrofuran. The mixture is then refluxed for 5 hours while introducing nitrogen. It is cooled to 5° and 5.5 ml. of water, 5.5 ml. of 15% sodium hydroxide solution and 16.5 ml. of water are added dropwise. The reaction mixture is filtered and the filter residue is washed with tetrahydrofuran. The filtrate is then evaporated at 40° under 11 torr. The residue, a yellow oil, is distilled under high vacuum. The 1-methyl-1,2,3,4-tetrahydro-4-dimethylamino-quinoline boils at 80° under 0.01 torr.

1 - methyl - 1,2,3,4 - tetrahydro - 4 - dimethylamino-7-chloro-quinoline, B.P. 100–110°/0.001 torr, hydrochloride M.P. 160–171° (from methanol/ether) is obtained in an analogous manner.

The 1 - methyl-1,2,3,4-tetrahydro-4-(N-methyl-formamido)-quinoline necessary for the above example is produced, e.g. as follows:

A solution of 3.3 g. of 1-methyl-1,2,3,4-tetrahydro-4-methylamino-quinoline (cf. Example 1) in 8 ml. of formic acid ethyl ester is refluxed for 16 hours. It is then cooled and the mixture is evaporated at 50° under 11 torr. The residue, a red oil, is chromatographed through 120 g. of Silicagel. The fractions eluted with ether/chloroform (5:1) are combined and crystallised from ether. The 1-methyl - 1,2,3,4 - tetrahydro-4-(N-methyl-formamido)-quinoline melts at 81–83°.

1-methyl - 1,2,3,4 - tetrahydro-4-(N-methyl-formamido)-7-chloroquinoline, M.P. 83–85° (from ethyl acetate/petroleum ether) is obtained analogously.

EXAMPLE 5

1-methyl-1,2,3,4-tetrahydro-4[(cyclopropylmethyl)-amino]-quinoline (A) A solution of 1-methyl-1,2,3,4-tetrahydro-4-cyclopropane carboxamido-quinoline in 65 ml. of anhydrous tetrahydrofuran is added dropwise to a 5° cold suspension of 2.43 g. of lithium aluminium hydride in 30 ml. of anhydrous tetrahydrofuran while introducing nitrogen. The mixture is then refluxed for 15 hours. It is cooled to 5° and 2.5 ml. of water, then 2.5 ml. of 15% sodium hydroxide solution and another 7.5 ml. of water are slowly added to the mixture. The precipitate is filtered off and washed well with tetrahydrofuran. The filtrate is evaporated under 11 torr at 40°. The residue is dissolved in ethyl acetate and the solution is extracted with 2 N hydrochloric acid. The acid aqueous solution is then made alkaline with 2 N sodium hydroxide solution and the oil which separates is extracted with chloroform. The chloroform solution is dried over sodium sulphate and evaporated at 40° under 11 torr. The residue is distilled under high vacuum. The 1-methyl - 1,2,3,4 - tetrahydro-4[(cyclopropylmethyl)-amino]-quinoline passes over at 100° under 0.001 torr. The hydrochloride is crystallised from methanol/ether, M.P. 135–137°.

(B) 1 - methyl-1,2,3,4-tetrahydro-4-(cyclopropylmethyl)-amino]-7-chloroquinoline, B.P. 141–142°/0.001 torr, and its hydrochloride, M.P. 177–179°, are produced in an analogous manner.

The starting material necessary for the above Example 5 (A) is produced, e.g. as follows:

(a) A solution of 10 g. of 1-methyl-2,3-dihydro-4(1H)-quinolone (see Example 1B), 6 g. of hydroxylamine hydrochloride and 6 ml. of pyridine in 100 ml. of ethanol is refluxed for 1 hour. It is then cooled and concentrated to about 20 ml. at 40° under 11 torr. On adding water, the oxime crystallises out. The 1-methyl-2,3-dihydro-4(1H)-quinolone oxime melts, after recrystallisation from ethanol/water, at 100–103°.

(b) A solution of 17.6 g. of 1-methyl-2,3-dihydro-4(1H)-quinolone oxime in 200 ml. of anhydrous butanol is refluxed while introducing nitrogen. 15.2 g. of sodium are added in portions and the whole is then refluxed for another hour. The mixture is cooled and diluted with 400 ml. of ether. The ether-butanol solution is extracted twice with 40 ml. of water and dried over sodium sulphate, after which the ether-butanol solution is evaporated to dryness under 11 torr. The residue is then fractionally distilled under high vacuum. The 1-methyl-1,2,3,4-tetrahydro-4-amino-quinoline boils at 74–75°/0.005 torr. The hydrochloride melts at 187–190°.

(c) A solution of 16.2 g. of 1-methyl-1,2,3,4-tetrahydro-4-aminoquinoline and 10 ml. of anhydrous pyridine in 100 ml. of anhydrous benzene is cooled to 5–10° while introducing nitrogen. A solution of 10.0 g. of cyclopropane carboxylic acid chloride in 50 ml. of anhydrous benzene is added dropwise to this mixture. The mixture is then stirred for 2½ hours at room temperature, diluted with 100 ml. of benzene and filtered. The filtrate is extracted three times with 40 ml. of 1 N hydrochloric acid and water each time. The combined hydrochloric acid extracts are made alkaline with 2 N sodium hydroxide solution. The oil which separates is extracted with ether. The ethereal solution is dried with sodium sulphate and evaporated under 11 torr at 40°. The 1-methyl-1,2,3,4-tetrahydro-4-cyclopropane carboxamido-quinoline crystallises from methanol, M.P. 165–167°.

The starting material for the production of the final compound obtained according to Example 5 (B), supra, is obtained as follows:

1.96 g. of 1-methyl-2,3,-dihydro-7-chloro-4(1H)-quinolone and 8.0 g. of formamide are mixed with each other and heated for four hours at about 180–190°. The mixture is then cooled and poured into 40 ml. of ice water. The aqueous mixture is then extracted with diethyl ether, the ether solution is separated, washed with water, dried over sodium sulphate and then evaporated to dryness under 11 torr. The residue which consists of 1-methyl-1,2,3,4-tetrahydro-4-formamido-7-chloroquinoline, is dissolved in a mixture of 20 ml. of ethanol and 10 ml. of aqueous 2 N-potassium hydroxide. The aqueous-ethanolic solution obtained is then boiled under reflux for 18 hours and is then evaporated to dryness under 11 torr on a waterbath of 50° temperature.

The residue is then dissolved in a chloroform/diethyl ether mixture of volume ratio 1:3. The resulting solution is washed with water, the organic phase is separated, dried over sodium sulphate and the solvent evaporated under 11 torr. The resulting residue is distilled under high vacuum and 1-methyl-1,2,3,4-tetrahydro-4-amino-chloroquinoline is isolated as an oily fraction boiling at 100–105°/0.001 torr.

The latter is then converted to 1-methyl-1,2,3,4-tetrahydro-4-cyclopropane carboxamido-7-chloro-quinoline, M.P. 188–191° (crystallised from methanol) by following the procedure described in step (c) above, and the latter intermediate is then reduced to the final product of Example 5 (B).

EXAMPLE 6

1-methyl-1,2,3,4-tetrahydro-4-methylamino-6-chloro-quinoline, B.P. 135–140°/0.01 torr, hydrochloride M.P. 184–186°, is obtained from 1-methyl-2,3-dihydro-6-chloro-4(1H)-quinolone by the procedure described in Example 1.

The above intermediate quinolone is obtained from p-chloro-aniline by condensation with propiolactone, cyclisation of the resulting β-(p-chloroanilino)-propionic acid to 2,3-dihydro-6-chloro-4(1H)-quinolone and methylation, with methyl bromide, of the latter to 1-methyl-2,3-dihydro-6-chloro-4(1H)-quinolone in accordance with the procedure described by Atwal et al. in J. Medicinal Chem. 8, 566 et seq. (1965).

In an analogous manner as described in Examples 6 and 1, there are obtained, by starting from the correspondingly substituted anilines and via the corresponding substituted quinolone derivatives:

(a) 1-methyl-1,2,3,4-tetrahydro-4-methylamino-6-fluoro-quinoline and its hydrochloride;
(b) 1-methyl-1,2,3,4-tetrahydro-4-methylamino-6-bromo-quinoline and its hydrochloride;
(c) 1-methyl-1,2,3,4-tetrahydro-4-methylamino-7-methoxy-quinoline, B.P. 130–132°/0.001 torr, and its hydrochloride;
(d) 1-methyl-1,2,3,4-tetrahydro-4-methylamino-6-methyl-quinoline, and its hydrochloride;
(e) 1-methyl-1,2,3,4-tetrahydro-4-methylamino-6-ethyl-quinoline, and its hydrochloride;
(f) 1-methyl-1,2,3,4-tetrahydro-4-allylamino-6-chloro-quinoline hydrochloride, M.P. 156–157°.

In a similar manner, but using in lieu of methylation with methyl bromide, alkylation with n-propyl bromide or alkenylation with allyl bromide, respectively, there is obtained (g) 1-n-propyl-1,2,3,4-tetrahydro-4-methylamino-6-chloro-quinoline hydrochloride;
(h) 1-allyl-1,2,3,4-tetrahydro-4-methylamino-6-chloro-quinoline and its hydrochloride; M.P. of the latter 186–188°.

EXAMPLE 7

1-methyl-1,2,3,4-tetrahydro-4-amino-7-chloro-quinoline

A solution of 5.9 g. of 1-methyl-2,3-dihydro-6-chloro-4(1H)-quinoline-oxime, prepared from 1-methyl-2,3-dihydro-6-chloro-4(1H)-quinolone and hydroxylamine hydrochloride by the method described in Example 5(a), in 60 ml. of ethanol is mixed with 200 g. of sodium amalgam containing 2.5% of Na. The resulting suspension is stirred for one hour at room temperature, while adding in small portions a total of 2.8 ml. of glacial acetic acid. The solution is then decanted from the mercury deposit formed, diluted with 100 ml. of water and the resulting aqueous ethanolic solution is extracted with ethyl acetate. The aqueous ethanolic solution is made alkaline with 2 N caustic soda lye and the oil formed is separated and dissolved in 100 ml. of diethyl ether. The ether solution is washed with water, dried over sodium sulphate and the solvent evaporated in vacuo. The residue is then distilled under high vacuum and the fraction, boiling at 100–105°/0.001 torr, is collected. It consists of 1-methyl-1,2,3,4-tetrahydro-4-amino-7-chloro-quinoline.

The latter is then treated further as described in Example 5(B).

I claim:

1. A compound of the formula

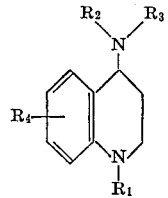

wherein:

$R_1$ is lower alkyl or lower alkenyl, $R_2$ is lower alkyl, lower alkenyl, lower cycloalkyl or lower cycloalkylmethyl, $R_3$ is hydrogen or lower alkyl, and $R_4$ is hydrogen, halogen of an atomic number not greater than 35, lower alkyl, lower alkoxy or trifluoromethyl and pharmaceutical acceptable acid addition salts thereof.

2. A compound as defined in claim 1 wherein each of $R_1$ and $R_2$ is methyl, $R_3$ is hydrogen and $R_4$ is chlorine linked to the 6-position of the quinoline nucleus and the hydrochloride salt thereof.

3. A compound as defined in claim 1 wherein each of $R_1$ and $R_2$ are methyl, $R_3$ is hydrogen, and $R_4$ is chlorine linked to the 7-position of the quinoline nucleus and the hydrochloride salt thereof.

4. A compound as defined in claim 1 wherein each of $R_1$ and $R_2$ are methyl and each of $R_3$ and $R_4$ is hydrogen and the hydrochloride salt thereof.

5. A compound as defined in claim 1 wherein $R_1$ is methyl, $R_2$ is ethyl and each of $R_3$ and $R_4$ is hydrogen and the hydrochloride salt thereof.

6. A compound as defined in claim 1 wherein $R_1$ is methyl, $R_2$ is cyclopropyl and each of $R_3$ and $R_4$ is hydrogen and the hydrochloride salt thereof.

7. A compound as defined in claim 1 wherein $R_1$ is propyl, $R_2$ is methyl and each of $R_3$ and $R_4$ is hydrogen and the hydrochloride salt thereof.

8. A compound as defined in claim 1 wherein each of $R_1$, $R_2$ and $R_3$ is methyl and $R_4$ is hydrogen and hydrochloride salt thereof.

9. A compound as defined in claim 1 wherein each of $R_1$, $R_2$ and $R_3$ is methyl and $R_4$ is chlorine linked to the 7-position of the quinoline nucleus and the hydrochloride salt thereof.

10. A compound as defined in claim 1 wherein $R_1$ is methyl, $R_2$ is cyclopropylmethyl and each of $R_3$ and $R_4$ is hydrogen and the hydrochloride salt thereof.

11. A compound as defined in claim 1 wherein $R_1$ is methyl, $R_2$ is cyclopropylmethyl, $R_3$ is hydrogen and $R_4$ is chlorine linked to the 7-position of the quinoline nucleus and the hydrochloride salt thereof.

References Cited

UNITED STATES PATENTS

| | | | |
|---|---|---|---|
| 2,333,493 | 11/1943 | Rigby | 260—288 |
| 2,554,737 | 5/1951 | Haefliger et al. | 260—288 X |
| 2,653,940 | 9/1953 | Johnson | 260—288 |
| 2,786,845 | 3/1957 | Mauss | 260—288 |
| 2,794,020 | 5/1957 | Harris | 260—288 |
| 3,178,434 | 4/1965 | Pfister et al. | 260—288 |
| 3,301,861 | 1/1967 | Pfister et al. | 260—286 |
| 3,332,954 | 7/1967 | Skau et al. | 260—287 |
| 3,384,640 | 5/1968 | Muchowski | 260—288 X |
| 3,452,026 | 6/1969 | Perron et al. | 260—288 |

OTHER REFERENCES

Dudykinia et al. (1965), Abstracted in Chem. Abstr., vol. 65, col. 8866 (1966).

DONALD G. DAUS, Primary Examiner

U.S. Cl. X.R.

260—286; 424—258